United States Patent [19]

Debney et al.

[11] 4,422,934
[45] Dec. 27, 1983

[54] MAGNETIC DEVICE FOR THE TREATMENT OF CALCAREOUS FLUIDS

[75] Inventors: Howard A. Debney, Mississauga; Darrell C. Spencer, Riverview, both of Canada

[73] Assignee: Debney-Spencer Industries Ltd., Mississauga, Canada

[21] Appl. No.: 384,208

[22] Filed: Jun. 2, 1982

[30] Foreign Application Priority Data

Apr. 22, 1982 [CA] Canada ................................. 401443

[51] Int. Cl.³ ............................................ B01D 35/06
[52] U.S. Cl. .................................................. 210/222
[58] Field of Search ....................... 210/222, 223, 695; 55/100; 209/223.1, 232

[56] References Cited

U.S. PATENT DOCUMENTS

| 2,583,522 | 1/1952 | Winslow et al. | 210/223 |
| 2,707,557 | 5/1955 | Spodig | 210/222 |
| 2,830,705 | 4/1958 | Johannesen | 210/222 |
| 3,186,549 | 6/1965 | Botstiber | 210/86 |
| 3,289,841 | 12/1966 | Quinting | 210/223 |
| 3,631,985 | 1/1972 | Taeger | 210/222 |
| 3,680,705 | 8/1972 | Happ et al. | 210/222 |
| 3,762,135 | 10/1973 | Ikebe et al. | 210/223 |
| 3,951,807 | 4/1976 | Sanderson | 210/222 |
| 4,146,479 | 3/1979 | Brown | 210/222 |
| 4,216,092 | 8/1980 | Shalhoob et al. | 210/222 |
| 4,226,720 | 10/1980 | Brigante | 210/222 |
| 4,367,143 | 1/1983 | Carpenter | 210/222 |

FOREIGN PATENT DOCUMENTS

WO81/02529 9/1981 PCT Int'l Appl. ................. 210/222

OTHER PUBLICATIONS

'Magnetic Water Conditioner Apparatus', Inventor: De Palma, Sep. 17, 1981, pp. 1–11 Including Figures.

Primary Examiner—Benoit Castel
Assistant Examiner—Wanda L. Millard
Attorney, Agent, or Firm—Moss, Bensette, Thompson, Squires

[57] ABSTRACT

A device is shown for magnetically treating liquids to inhibit the deposit of scale in plumbing systems, appliances, boilers, etc. The device has an elongate housing with an inlet and an outlet for the flow of liquid therethrough. A support structure is located inside the housing to retain a plurality of longitudinally spaced-apart magnets. The magnets are held in position by a plurality of transverse holding elements which are positioned so that the magnets are angularly disposed in a helical arrangement. The magnets are directly immersed in the liquid flowing through the device.

13 Claims, 4 Drawing Figures

U.S. Patent   Dec. 27, 1983   Sheet 2 of 2   4,422,934
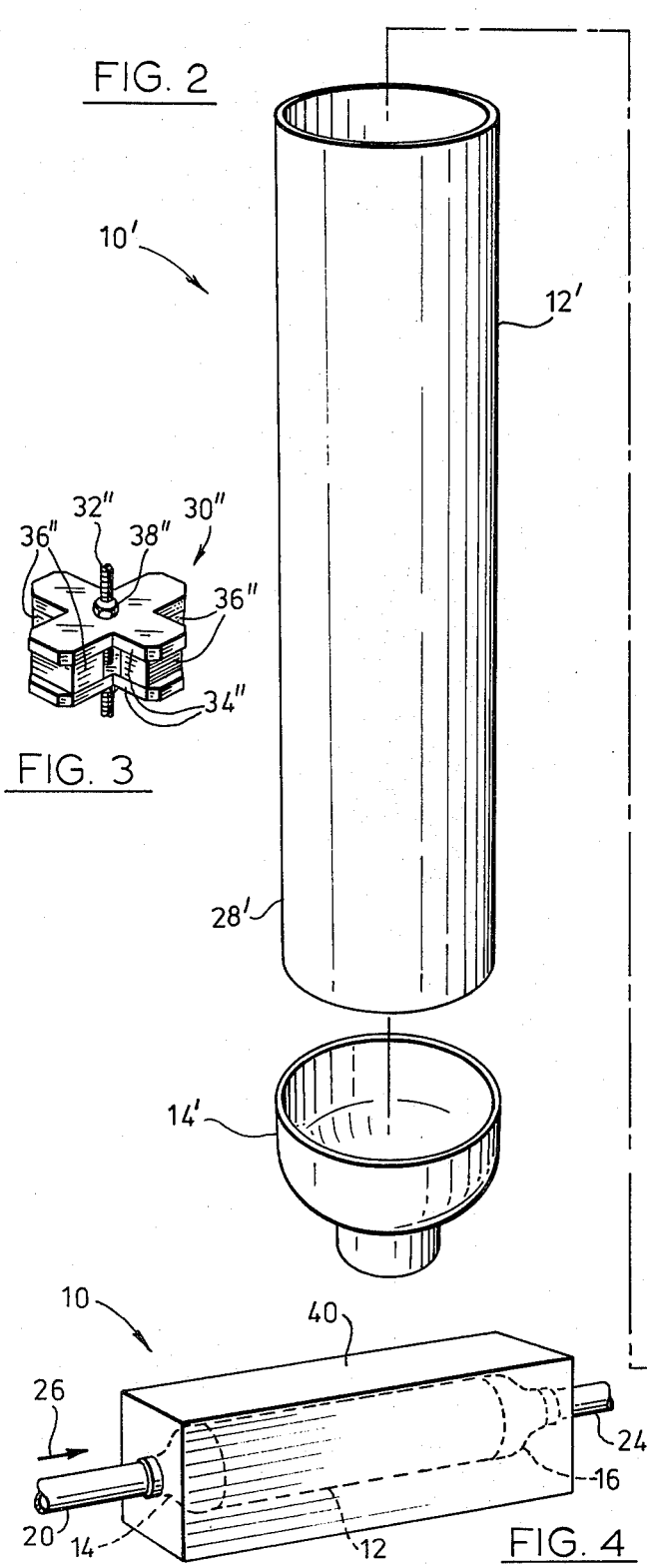
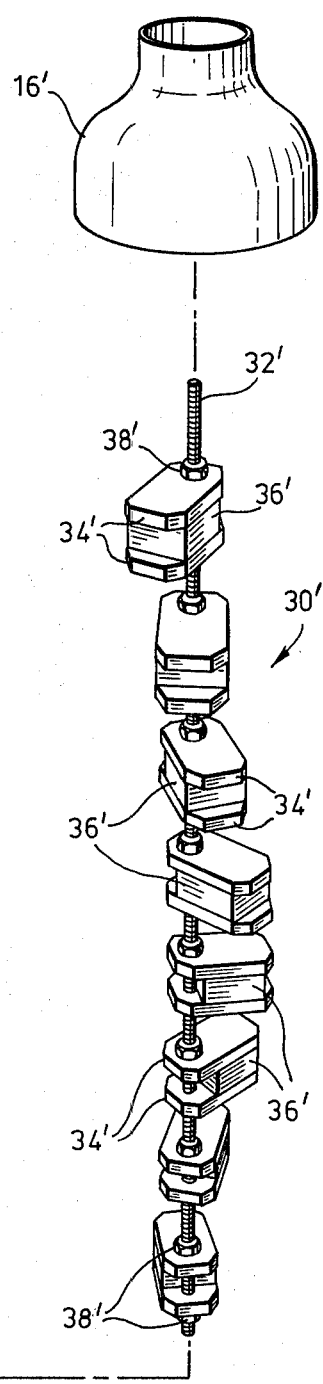
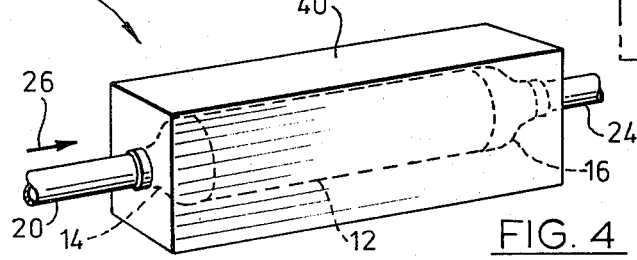

MAGNETIC DEVICE FOR THE TREATMENT OF CALCAREOUS FLUIDS

BACKGROUND OF THE INVENTION

This invention relates to apparatus for magnetically treating liquids, such as water, having a calcareous content, to reduce the deposit of scale in plumbing systems, appliances, boilers and the like.

In the past, devices have been produced for subjecting water to magnetic lines of force. This has an effect on the calcium or magnesium in the water and it reduces the deposit of scale inside pipes or on other surfaces with which the water is in contact. An example of such a prior art device is shown in U.S. Pat. No. 3,680,705 issued to George M. Happ et al. Another example of a similar prior art device is shown in U.S. Pat. No. 4,216,092 issued to William N. Shalhoob et al. In each of these prior art devices magnets are enclosed in non-ferrous tubes or envelopes. In one case, vanes are used to alter the flow path of the liquid passing through the device so that the liquid cuts the lines of force of the magnets at right angles. In the other case, the housing of the device is shaped to affect the velocity of the liquid flow in relation to the arrangement of magnetic lines of force. A difficulty with the prior art devices, however, is that they are not sufficiently efficient to be commercially acceptable.

SUMMARY OF THE INVENTION

The present invention has a helical arrangement of magnets directly immersed in the liquid to be treated resulting in a very efficient magnetic water treatment device.

According to the invention, there is provided a device for magnetically treating liquids to prevent the formation of scale. The device comprises an elongate housing having an inlet and an outlet for the flow of liquid therethrough. A support member is located in the housing. A plurality of transverse holding elements are connected to the support member and arranged longitudinally spaced-apart inside the housing. Also, a plurality of longitudinally spaced-apart magnets are located inside the housing for directly contacting the liquid in the housing, the magnets being angularly disposed in a helical arrangement, the holding elements engaging and retaining the magnets in position.

BRIEF DESCRIPTION OF THE DRAWINGS

A preferred embodiment of the invention will now be described, by way of example, with reference to the accompanying drawings, in which:

FIG. 2 is an exploded perspective view similar to FIG. 1, but showing another embodiment of the invention;

FIG. 3 is a perspective view of yet another embodiment of the holding elements and magnets as used in the present invention; and FIG. 4 is a perspective view of an assembled liquid treatment device of the present invention as it would be installed and having an outer casing.

DETAILED DESCRIPTION OF THE PREFERRED EMBODIMENT

Figure 1:
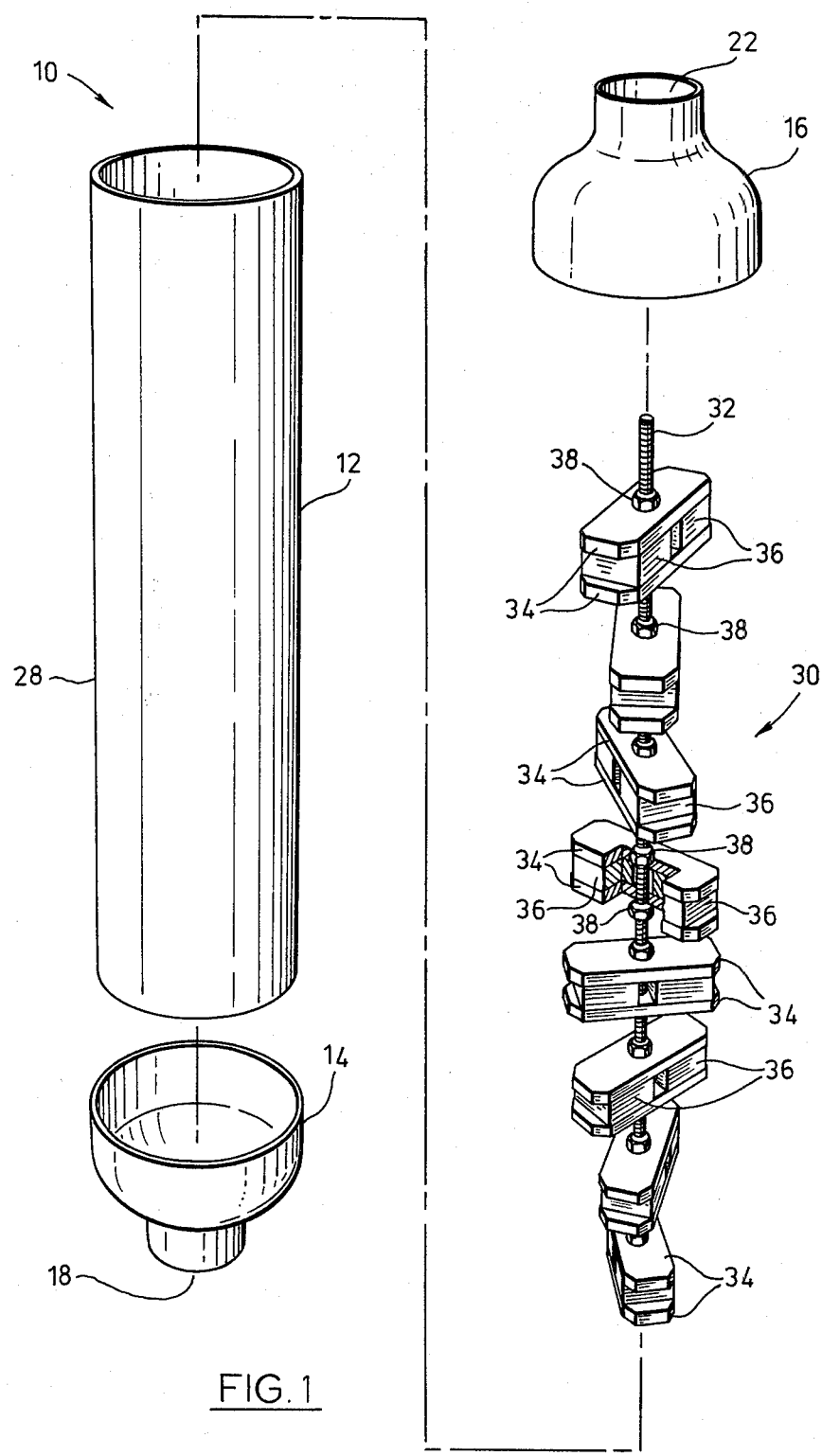
FIG. 1 is an exploded perspective view of a preferred embodiment of the liquid treatment device according to the present invention.

Referring firstly to FIG. 1, a magnetic device for the treatment of calcareous fluids is generally indicated by reference numeral 10. Liquid treatment device 10 is primarily used for the magnetic treatment of water containing calcium or calcium carbonate or similar scale-forming materials. However, device 10 could be used for treating other liquids containing other scale-forming materials such as magnesium. For the purposes of this specification, the term "calcareous" shall include all scale-forming materials that are affected by magnetism so as to reduce the formation of scale deposits in plumbing systems, appliances, boilers and the like.

Liquid treatment device 10 includes an elongate housing 12 having an inlet end portion 14 and an outlet end portion 16. Inlet end portion 14 has a lower inlet opening 18 which is connected to a liquid supply pipe 20 (see FIG. 4). Supply pipe 20 represents the liquid supply such as the water supply pipe for a plumbing system to be protected by liquid treatment device 10.

The outlet end portion 16 has an outlet opening 22 which is connected to an outlet pipe 24 (see FIG. 4) leading to the plumbing system, etc. to be protected by liquid treatment device 10. As seen in FIG. 4, the liquid flows through device 10 in the direction of arrow 26.

Housing 12 is typically formed of copper having a central tubular portion 28 to which inlet end portion 14 and outlet end portion 16 are attached by soldering. Central tubular portion 28 ranges in diameter from 2 inches to 4 inches, and ranges in length from 12 inches to 20 inches. The 2 inch diameter, 12 inch long size would be used for residential plumbing systems, and the larger sizes would be used for higher volume applications, with the 20 inch long, 4 inch diameter device being used for heavy duty commercial installations. Inlet and outlet openings 18, 22 would be sized to be connected to conventional plumbing piping ranging in diameter from ½ inch to 2 inches. Inlet and outlet end portions 14, 16 are connected to the plumbing system by conventional means such as soldering or by using releasable couplings or unions.

A magnet assembly 30 is located inside housing 12 and the outer dimensions of magnet assembly 30 correspond with the inside dimensions of housing 12, so that the magnet assembly fits inside housing 12 with a loose sliding fit. Magnet assembly 30 is, of course, located inside tubular portion 28 of housing 12 before the inlet and outlet end portions 14, 16 are assembled to central tubular portion 28.

Magnet assembly 30 has a central support member 32 in the form of an elongate threaded rod. Support member 32 is typically formed of brass threaded rod, but it could be some other material that is resistant to corrosion, such as stainless steel. A plurality of transverse holding elements 34 are connected to support member 32 by having support member 32 pass through central openings in the holding elements 34. Holding elements 34 are typically made of ¼ inch by 1 inch zinc-coated, magnetically-attracted metal and are approximately 2-¾ inches in length. Holding elements 34 are arranged in pairs with each pair of having the holding elements parallel or in registration. The holding elements 34 are longitudinally spaced-apart along support member 32, and the pairs of holding elements are orientated to form a helix along the length of the liquid treatment device 10. Ceramic magnets 36 are located between respective holding elements of each pair of holding elements 34, there being one magnet on either side of support member 32. Magnets 36 are typically 1 inch square and $\frac{1}{8}$ inch thick, and all of the magnets 36 are oriented with their south poles facing toward inlet end portion 14, or downwardly as viewed in FIG. 1. For the larger sizes of liquid treatment device 10, magnets 36 are typically 1-$\frac{1}{2}$ inches square and $\frac{1}{8}$ inch thick.

Nuts 38 located on either side of each pair of holding elements 34 act as clamping means for clamping the magnets between the holding elements and retaining the holding elements and magnets in position. It will be apparent from FIG. 1, that the magnets 36 are longitudinally spaced-apart as well, and are angularly disposed in a helical arrangement. The magnets 36 are immersed in and directly contact the liquid flowing through liquid treatment device 10.

To assemble liquid treatment device 10, the pairs of holding elements 34 are put together with a magnet 36 located at each end of the pair of holding elements. The nuts 38 and associated pairs of holding elements with magnets are slid onto support member 32. The holding elements with magnets are orientated in the desired helical arrangement and nuts 38 are then tightened to retain the magnets in position. Magnet assembly 30 is then slid into tubular portion 28 of housing 12, and the inlet and outlet end portions 14, 16 are attached to tubular portion 28. As seen in FIG. 4, a rectangular casing 40 made of polyvinylchloride may be placed over housing 12 if desired.

In operation, liquid treatment device 10 is installed in the water supply line for the plumbing system or any other specific application where protection from scale formation is desired. The size of the liquid treatment device 10 or the internal components thereof depends upon the flow rate through the liquid supply line in which it is installed. The liquid treatment device 10 should be large enough to avoid any significant flow restriction in the supply line, but small enough to avoid any stagnation areas or settlement reservoirs inside device 10 where accumulations of foreign matters can occur. This makes liquid treatment device 10 somewhat self-cleaning in most normal water supply systems.

Referring next to FIG. 2, another embodiment of liquid treatment device according to this invention is generally indicated by reference numeral 10'. In the embodiment of FIG. 2, primed reference numerals are used to indicate parts similar to those in the embodiment shown in FIG. 1. The housing 12' of liquid treatment device 10' includes a central tubular portion 28', an inlet end portion 14' and an outlet end portion 16' which are the same as in the embodiment of FIG. 1. The ranges of the dimensions of liquid treatment device 10' are also the same as the embodiment shown in FIG. 1. Also, the assembly, installation and operation of liquid treatment device 10' are the same as the embodiment of FIG. 1.

Liquid treatment device 10' has a magnet assembly 30' which has a central support member 32', nuts 38', magnets 36' and holding elements 34'. It will be apparent on comparing the embodiments of FIGS. 1 and 2 that holding elements 34' are shorter in length, having support member 32 pass through openings adjacent to one end of holding elements 34'. Each pair of holding elements 34' has only one ceramic magnet 36' associated therewith. However, the pairs of holding elements and associated magnets are still longitudinally spaced-apart and angularly disposed in a helical arrangement. As in the case of the embodiment of FIG. 1, the preferred orientation of magnets 36' is that they are all arranged with their south poles facing housing inlet end portion 14'.

Referring next to FIG. 3, another embodiment of magnet and holding element combination is shown. This is a portion of a magnet assembly 30", there being a plurality of pairs of holding elements 34" in the magnet assembly 30". As in the embodiments shown in FIGS. 1 and 2, the pairs of holding elements 34" are longitudinally spaced-apart along support member 32" and the pairs of holding elements 34" are angularly disposed in a helical arrangement. The holding elements 34" are in the form of transverse crosses in plan view, and a ceramic magnet 36" is located at each distal end of each pair of holding elements 34". Since the holding elements 34" are in the form of transverse crosses, magnets 36" are retained in a double helix arrangement inside the liquid treatment device housing. The ranges of sizes, assembly and operation of the liquid treatment device using the magnet assembly shown in FIG. 3 are similar to those of the embodiments shown in FIGS. 1 and 2.

Having described preferred embodiments of the invention, it will be apparent that various modifications may be made to the structures described. For example, the direction or directions in which the magnets face could be changed. Different materials could be used for the various components, including the magnets, provided that the materials are acceptable from the point of view of corrosion for the particular liquid flowing through the liquid treatment device. Different types of holding elements or support members could be used to retain the magnets in position, if desired. Further, the housing could be made with demountable or removable end portions to permit the liquid treatment device to be disassembled for cleaning.

What we claim as our invention is:

1. A device for magnetically treating water to prevent the formation of scale, the device comprising:
   an elongate housing having an inlet and an outlet for the flow of water therethrough, said housing being dimensioned so as not to restrict liquid flow through the device and to prevent the formation of settlement reservoirs inside the housing;
   a support member located in the housing;
   a plurality of transverse holding elements in the form of metal plate members connected to the support member and arranged longitudinally spaced-apart inside the housing, said holding elements being arranged in pairs with each pair being arranged in parallel;
   a plurality of magnets located inside the housing for directly contacting the water in the housing, the magnets being angularly disposed in a helical arrangement and oriented with their poles all facing the same direction, each magnet being located between and retained in position by a respective pair of holding elements; and
   clamping means connected between the support member and the holding elements for clamping the magnets between the holding elements.

2. A device as claimed in claim 1 wherein the magnets are orientated with their south poles facing the housing inlet.

3. A device as claimed in claim 2 wherein the magnets are ceramic magnets.

4. A device as claimed in claim 1 wherein a magnet is located at each end of a pair of holding elements.

5. A device as claimed in claim 4 wherein the support member is an elongate threaded rod located to pass through the centre of each holding element, and wherein the clamping means are nuts threaded onto the rod to engage the holding elements and clamp the magnets therebetween.

6. A device as claimed in claim 4 wherein the magnets are orientated with their south poles facing the housing inlet.

7. A device as claimed in claim 1 wherein the holding elements are in the form of transverse crosses in plan view, a magnet being located at each distal end of a pair of holding elements, the magnets thereby being retained in a double helix arrangement inside the housing.

8. A device as claimed in claim 7 wherein the support member is located to pass through the centre of each holding element.

9. A device as claimed in claim 7 wherein the support member is an elongate threaded rod located to pass through the centre of each holding element, and wherein the clamping means are nuts threaded onto the rod to engage the holding elements and clamp the magnets therebetween.

10. A device as claimed in claim 1, wherein the support member is an elongate threaded rod, and wherein the clamping means are nuts threaded onto the rod to engage the holding elements and clamp the magnets therebetween.

11. A device as claimed in claim 1 wherein said metal place members are made from magnetically attracted metal.

12. A device as claimed in claim 11 wherein said plates are each at least ¼ inch thick.

13. A device as claimed in claim 11 wherein the magnets are oriented with their south poles facing the housing inlet.

* * * * *